(12) United States Patent
Bargh et al.

(10) Patent No.: US 11,391,619 B2
(45) Date of Patent: Jul. 19, 2022

(54) FILTRATION SYSTEM AND WEIGHING DEVICE THEREFOR

(71) Applicant: The Automation Partnership (Cambridge) Limited, Royston (GB)

(72) Inventors: Adrian Neil Bargh, Royston (GB); Stefanie Meyer, Göttingen (DE)

(73) Assignee: The Automation Partnership (Cambridge) Limited

( * ) Notice: Subject to any disclaimer, the term of this patent is extended or adjusted under 35 U.S.C. 154(b) by 0 days.

(21) Appl. No.: 16/652,976

(22) PCT Filed: Oct. 4, 2018

(86) PCT No.: PCT/EP2018/076960
§ 371 (c)(1),
(2) Date: Apr. 1, 2020

(87) PCT Pub. No.: WO2019/068789
PCT Pub. Date: Apr. 11, 2019

(65) Prior Publication Data
US 2020/0284644 A1    Sep. 10, 2020

(30) Foreign Application Priority Data

Oct. 6, 2017   (EP) .................................. 17001652

(51) Int. Cl.
*G01G 19/18*   (2006.01)
*B01D 61/10*   (2006.01)
(Continued)

(52) U.S. Cl.
CPC ............. *G01G 19/18* (2013.01); *B01D 61/10* (2013.01); *B01D 61/12* (2013.01); *B01D 61/20* (2013.01);
(Continued)

(58) Field of Classification Search
CPC .... G01G 19/18; G01G 3/1414; G01G 19/021; G01G 5/00; G01G 5/003; G01G 5/04;
(Continued)

(56) References Cited

U.S. PATENT DOCUMENTS 2,995,034 A * 8/1961 Boiten ................. G01L 1/2231
    73/862.635
3,741,328 A * 6/1973 Andersson ........... G01G 3/1408
    177/210 R
(Continued)

FOREIGN PATENT DOCUMENTS

DE    203 16 287 U1    1/2004

OTHER PUBLICATIONS

International Search Report and Written Opinion, dated Feb. 1, 2019, issued for International Patent Application No. PCT/EP2018/076960, 19 pages.

*Primary Examiner* — Joseph W Drodge
(74) *Attorney, Agent, or Firm* — Klarquist Sparkman, LLP

(57) ABSTRACT

The present invention relates to a filtration system comprising a cabinet, a filtration device having a filtrate or retentate vessel arranged outside the cabinet, and a weighing device that is configured to weigh the filtrate or retentate vessel. The weighing device can be arranged inside an enclosure and the enclosure can be arranged inside the cabinet.

19 Claims, 7 Drawing Sheets

(51) Int. Cl.
*B01D 61/12* (2006.01)
*B01D 61/20* (2006.01)
*B01D 61/22* (2006.01)
*B01D 61/30* (2006.01)
*B01D 61/32* (2006.01)
*B01D 61/36* (2006.01)
*G01G 3/14* (2006.01)

(52) U.S. Cl.
CPC .............. *B01D 61/22* (2013.01); *B01D 61/30* (2013.01); *B01D 61/32* (2013.01); *B01D 61/368* (2013.01); B01D 2311/08 (2013.01); B01D 2311/103 (2013.01); B01D 2313/16 (2013.01); B01D 2313/243 (2013.01); B01D 2315/08 (2013.01); B01D 2315/10 (2013.01); *G01G 3/1414* (2013.01)

(58) Field of Classification Search
CPC .......... G01G 5/06; G01G 17/04; G01G 17/06; G01G 19/14; G01G 19/16; G01G 19/34; G01G 19/38; B01D 61/10; B01D 61/12; B01D 61/20; B01D 61/22; B01D 61/30; B01D 61/32; B01D 61/368; B01D 2311/08; B01D 2311/103; B01D 2313/16; B01D 2313/243; B01D 2315/08; B01D 2315/10; B01D 35/30; B01D 35/31; B01D 2311/10; B01D 2311/106; B01D 2313/38; B01D 29/60; B01D 29/605; B01D 35/143; A61M 1/1609; A61M 1/1643; A61M 1/341; A61M 1/3451; C12M 23/00; C12M 23/42; C12M 41/44; B65D 81/38; B65D 81/3813; B65D 81/3825; C02F 1/008; C02F 2209/01; C02F 2209/42
See application file for complete search history.

(56) References Cited

U.S. PATENT DOCUMENTS

| | | | |
|---|---|---|---|
| 4,481,827 A | | 11/1984 | Bilstad et al. |
| 4,851,018 A | * | 7/1989 | Lazzari .................... F24F 3/167 414/217 |
| 5,092,988 A | * | 3/1992 | Womack, II ............ E21B 43/40 177/210 R |
| 5,458,566 A | | 10/1995 | Herrig et al. |
| 6,069,343 A | * | 5/2000 | Kolowich ........... A61M 1/1656 219/399 |
| 2002/0043487 A1 | | 4/2002 | Schick |
| 2002/0128582 A1 | | 9/2002 | Farrell et al. |
| 2003/0111277 A1 | | 6/2003 | Aumard et al. |
| 2006/0163125 A1 * | | 7/2006 | Olivier ................. G01N 1/4005 210/86 |
| 2007/0276328 A1 * | | 11/2007 | Childers ............... A61M 1/288 604/131 |
| 2008/0177222 A1 * | | 7/2008 | Roger .................... A61M 1/341 604/29 |
| 2009/0312694 A1 * | | 12/2009 | Bedingfield ........ A61M 1/1656 604/29 |
| 2011/0315611 A1 * | | 12/2011 | Fulkerson ........... A61M 1/1645 210/96.2 |
| 2015/0196701 A1 * | | 7/2015 | Ritter ..................... A61M 1/16 210/646 |
| 2016/0058932 A1 * | | 3/2016 | Stetson, Jr. .......... B01D 63/082 210/646 |

* cited by examiner

FILTRATION SYSTEM AND WEIGHING DEVICE THEREFOR

CROSS REFERENCE TO RELATED APPLICATIONS

This is the U.S. National Stage of International Application No. PCT/EP2018/076960, filed Oct. 4, 2018, which was published in English under PCT Article 21(2), which in turn claims the benefit of European Patent Application No. 17 001 652.1, filed Oct. 6, 2017. The prior applications are incorporated herein by reference in their entirety.

The invention relates to filtration, particularly to crossflow filtration, and to a respective weighing device and more particularly to the weighing of a retentate vessel of a crossflow filtration system.

Crossflow filtration is a commonly used filtering process in which feed flows substantially parallel to a membrane surface, thereby preventing accumulation of build-up on the membrane. Filter cake formation, which is usual for dead-end filtration, does not occur in crossflow filtration processes. A fraction of the feed passes through the membrane, which is called permeate. The fraction that does not pass through the membrane is called retentate. During the crossflow filtration process the retentate is being recirculated, i.e. directed again across the membrane surface. The desired end product may be contained in the permeate and/or retentate.

The crossflow filtration technology can be applied very widely to process, e.g., fluids, emulsions, suspensions, beverages, such as water, juice, beer, wine, whey, milk, sewage and solutions, e.g., for biotechnological, pharmaceutical, biopharmaceutical, biogenetic, medical, chemical, cosmetic and laboratory applications.

US2008/177222 A1 describes a dialysis system including an enclosure; a dialysate pump carried by the enclosure and arranged to pump dialysate to a patient or dialyzer; at least one container connected fluidly to the dialysate pump; a load cell positioned to weigh dialysate located within the container; an accelerometer positioned and arranged to detect a force imparted on at least one of the enclosure and the container; and electronics configured to receive a first signal from the load cell and a second signal from the accelerometer and process the first and second signals so as to determine if an abnormality sensed by the load cell is a system error or a mechanical interference.

In order to improve the process control, a crossflow filtration system is desirable that provides information on the weight of the retentate. Most crossflow filtration systems contain a filtrate or retentate liquid vessel in the flow circuit. It is therefore desirable to measure the weight of such filtrate or retentate vessels in a simple and effective manner at low costs.

Accordingly, it is an object of the present invention to provide a filtration system that enables weighing of a filtrate or retentate vessel that is arranged in the flow circuit of the filtration system.

The above object is solved by the subject-matter of the independent claims. Preferred embodiments are defined in the dependent claims.

According to one aspect of the present invention, a filtration system, particularly crossflow filtration system, is provided, comprising: a cabinet, a filtration device having a filtrate or retentate vessel arranged outside the cabinet, and a weighing device that is configured to weigh the filtrate or retentate vessel.

Advantageously, the weight of a filtrate or retentate vessel external to the cabinet can be measured. Also any other component being associated with the filtration system, in particular a permeate vessel and/or reservoirs, such as a feed reservoir, may be weighed by the same and/or a further weighing device. The weighing device may use any measurement principle suitable for determining the weight of the filtrate or retentate vessel.

The type and design of the filtration system is not limited. It is preferably designed for microfiltration, ultrafiltration, nanofiltration, pervaporation and/or reverse osmosis applications. The filtration system may be designed for the filtration of solid and/or gaseous materials.

The cabinet houses components of the filtration system as well as electric or electronic equipment. The cabinet generally defines a cabinet inside or interior and a cabinet outside. The cabinet inside or interior preferably defines an enclosed volume, but may also have apertures, e.g., for ventilation. The inside of the cabinet may be accessible from the outside, for example by a door-like mechanism. The cabinet may further comprise interfaces for connecting one or more elements in the cabinet inside or interior with respective element(s) arranged in the cabinet outside. In addition, one or more sensors may be disposed in the cabinet inside or interior and/or on the cabinet for the measurement of one or more quantities such as temperature, humidity, light, air velocity, air pressure, magnetic fields and/or noise, wherein the filtration system may be manipulated depending on a change of the measured values.

The filtration device comprises all members that are involved in the filtration process. The design of the filtration device is not limited, in particular with respect to the type, number and arrangement of members, and the flow circuitry that is built by fluidically coupling members of the filtration device. The filtration device may comprise, e.g., a filtration module (also referred to as filter), comprising one or more filter media, such as a metal, ceramic and/or polymer membrane, at least one feed inlet, at least one permeate outlet, at least one filtrate or retentate outlet; a filtrate or retentate vessel comprising at least one inlet and at least one outlet. A flow circuitry is built by fluidically coupling members of the filtration device. In particular, the feed inlet is fluidically coupled to an outlet of the filtrate or retentate vessel by a feed conduit. The filtrate or retentate outlet is fluidically coupled to an inlet of the filtrate or retentate vessel by a filtrate or retentate conduit. In other word conduits provide fluid communication between the inlet and outlet of the filtration module, thereby forming a circulation loop. The filtration device may comprise more than one circulation loop, wherein each loop may comprise reservoirs. Further conduits may be arranged so as to return permeate into the circulation loop. Additional reject conduits may be fluidically coupled at arbitrary positions to the circulation loop(s) for enabling reject of media flowing within the circulation loop(s). The filtrate or retentate vessel is arranged outside the cabinet, while other members of the filtration device may be arranged either inside or outside the cabinet.

The weighing device is configured to weigh particularly the filtrate or retentate vessel. For this purpose, the filtrate or retentate vessel is connected to the weighing device such that the filtrate or retentate vessel's weight is transmitted to the weighing device and the weight of the filtrate or retentate vessel can be determined. As already mentioned the weighing device may also be configured to weigh other members of the filtration device.

Advantageously the weight information of the filtrate or retentate vessel can be used to derive information about the filtering process and perform control actions.

The weighing device is arranged inside an enclosure, wherein the enclosure is arranged inside the cabinet.

The enclosure may define an enclosure inside or interior and an enclosure outside or exterior, wherein preferably the enclosure provides an enclosed volume. The enclosure can be of any material or material combination. Potentially the enclosure could be manufactured from an open pored buffer material, e.g., sintered nylon or unfired ceramic, and the external surface of the enclosure could be sealed with a water vapor barrier material. Advantageously, the enclosure minimizes the influence of any environmental factors on the weighing device as well as the magnitude of random and systematic measurement errors. Incorporating the weighing device within the cabinet advantageously enables to maintain the design of compact and small scale systems. Pressure differences may exist between the inside and the outside of the cabinet, wherein such pressure differences create an offset of the weight measured. It is also known that air draft causes weight reading instabilities. Any offset and instability due to pressure differences and/or draft are at least minimized or even prevented by housing the weighing device in an enclosure that in turn is housed inside the cabinet.

Preferably, the enclosure is configured provide a stabilized environment in its interior, particularly with respect to humidity and/or temperature.

In particular, a stabilized environment regarding humidity and/or temperature around the weighing device is desirable for an increased weight reading stability. Filtrations may be conducted over various time durations. Advantageously, the enclosure provides a stabilized environment in its interior substantially over the whole filtration process time. In many applications it is desirable that the enclosure provides stabilized condition in its interior up to 6 hours, preferably up to 12 hours and more preferably up to 24 hours. In this context stabilized particularly means that a rate of change of the humidity and/or temperature in the interior has a time constant T of at least about 2 hours, more preferably of at least about 5 hours. In other words, the enclosure provides for a dampening or insulating effect of the influences of the outside or exterior of the enclosure on the interior of the enclosure in view of the humidity and/or the temperature.

Preferably, the weighing device comprises a load cell.

A load cell can be exposed to a force to be measured, which may be a weight. Load cells create an electrical signal that is related (particularly directly proportional) to the applied force. The load cell can be of any type and design. For example, the load cell can be a piezoelectric or strain gauge load cell. Advantageously, load cells are easy and cost efficient to implement and ensure effective, reliable, accurate weight measurements.

Preferably, the filtration system further comprises a load transfer connection configured to connect the weighing device and the filtrate or retentate vessel so as to transfer a weight force from the filtrate or retentate vessel to the weighing device.

The load transfer connection can be of any material and cross section. It can have an arbitrary structure, e.g. it can extend along a straight path and/or a path including junctions. Advantageously, the filtrate or retentate vessel can be arranged apart from the weighing device, thus the weighing device and the filtrate or retentate vessel can be in indirect connection with each other.

Preferably, a force transmission point of the gravitational force of the filtrate or retentate vessel, to the load cell is located on a neutral axis of the load cell. Particularly, the load transfer connection comprises a portion that extends substantially horizontal through the cabinet.

Advantageously, any pressure differences between the inside and outside of the cabinet cause a minimum load cell deflection and therefore a minimum offset of the weight measured.

Preferably, the enclosure further comprises an aperture, wherein the load transfer connection extends at least partially through the aperture.

Advantageously, the weighing device can be connected to the filtrate or retentate vessel, if the weighing device is fully surrounded by the enclosure.

Preferably, the aperture and the load transfer connection define a diffusion path having a depth to aperture area ratio in the range of approximately 1:5 to approximately 1:20, preferably of approximately 1:8 to 1:15, more preferably of approximately 1:10 to 1:15.

By disposing an aperture to the enclosure, the enclosure inside and enclosure outside of the enclosure may be in communication with each other. Thus, air might diffuse from the enclosure outside into the enclosure inside and vice versa. The area through which air might pass, is defined by the aperture area and the cross sectional area of the load transfer connection. In other words, the difference between the aperture area and cross sectional area of the load transfer connection define the effective area of the diffusion path. In addition, the aperture depth defines the length of the diffusion path. Accordingly, adjustments to the size of aperture area, load transfer connection cross section and the aperture depth can influence a potential diffusion over the diffusion path. For example, with a long aperture depth and a small effective area of the diffusion path, diffusion of air from the enclosure outside into enclosure inside, and vice versa, can be decelerated. Advantageously, a slow diffusion path to water vapour and/or in general to any gaseous media can be provided.

Preferably, the enclosure further comprises at least one seal configured to seal the diffusion path from the exterior of the enclosure; and/or a pressure equalization vent configured to equalize the pressure inside and outside the enclosure.

The seal can be of any type and material. For example, the seal can be a liquid seal having a low or non-hygroscopic characteristic and/or a low vapor pressure such as silicon oil, or the seal could be a membrane with low water permeability. When disposing a seal to the diffusion path, it may be necessary to vent the enclosure so that the pressure inside and outside the enclosure stay in equilibrium in case atmospheric temperature and/or pressure changes. Such a vent is preferably a long thin vent such as a thin tube. Advantageously, the seal provides an enhanced barrier to gaseous media.

Preferably the enclosure comprises a cover having the aperture and an enclosure body, wherein preferably the cover is sealed to the enclosure body.

Accordingly, the enclosure can be a multipart assembly. The cover is removable in order to enable access to the enclosure inside. The enclosure body comprises all other surfaces that build the enclosure inside volume. For example, if the enclosure is in a cuboid shape, the cover is preferably a plate and the enclosure body comprises a bottom wall and four side walls that are arranged perpendicular to the cover and the bottom wall. Advantageously, all components being arranged inside the enclosure can be removed and/or replaced.

The cover seal can be of any type and design. For example, the seal may include a sealant such as for example rubber, polymer, metal, fiber gasket. The sealant is preferably disposed in a recess either in the cover and/or the enclosure body. The seal can also be realized as a design feature of the enclosure, such as a step-like shape at the circumference of the cover and enclosure base. Advantageously, the cover seal prevents leakage at the seal surface, in particular it prevents diffusion of gaseous media into the enclosure inside over the seal surface.

Preferably, the enclosure further comprises at least one humidity buffer and/or temperature buffer.

Advantageously, the at least one humidity buffer provides an enhanced humidity control in the enclosure inside. The buffer is preferably capable of maintaining the internal humidity over the duration of the filtration process, preferably at least up to about 6 hours, more preferably up to about 12 hours and most preferably up to about 24 hours. The type and design of the buffer is not limited. There are many materials being suitable for the humidity buffer, such as wood, cotton, paper, wool, ceramic, saturated salt solution, silica gel or any combination thereof. The buffer material should be replaced, if it is saturated.

Preferably, a thermal insulation is provided on or to the enclosure so as to at least partially thermally insulate the weighing device from the exterior of the enclosure.

The thermal insulation can be arranged on the inside and/or outside surfaces of the enclosure and/or within the enclosure material. Advantageously, the insulation provides an improved stability of the enclosure inside temperature, wherein a rate of change of the temperature in the inside of the enclosure has a time constant T of at least about 2 hours, more preferably of at least about 5 hours.

Preferably, the weighing device further comprises a temperature sensor and/or a heater, arranged inside the enclosure, wherein the heater preferably comprises a Peltier device.

To maintain the enclosure inside at a substantially constant temperature, the enclosure can be heated to a temperature above the normal expected room temperature and then maintained at that temperature, for example by means of a resistive heater and preferably by a Peltier device. A temperature sensor and/or a controller (such as a proportional-integral-derivative (PID) controller) may be additionally used to detect and control temperature. Advantageously, an active temperature control system is provided to the enclosure. If applying the heat directly to the enclosure material, the enclosure material preferably comprises a material with high thermal conductivity in order to have an even temperature distribution in the enclosure material. In this case, also a low thermal mass enclosure is preferred, particularly made of light-weight plastic. Advantageously, the efficiency of a PID control loop for the heater can be increased. Furthermore, the time needed to get to the temperature set point can be decreased. Using a Peltier device advantageously removes the time needed to get to the temperature set point as a Peltier device is capable of heating and cooling and therefore it could maintain the temperature at the temperature at the time of power up.

Preferably, the filtration device further comprises: a ventilation system configured to vent the cabinet; and/or a pump arranged inside the cabinet; and/or a filter arranged outside the cabinet and/or at least one valve in the filtration device and/or and or at an interface of the filtration device.

The ventilation system may comprise a plurality of air vents on the cabinet and preferably at least one air fan. The ventilation system can be selectively switched on and enables air exchange with ambient air. Advantageously, the cabinet inside temperature can be maintained close to ambient. In addition, it can be important for some process fluids to be maintained very close to ambient conditions. Advantageously, the ventilation system can cool down process fluids flowing through conduits that are arranged inside the cabinet.

The pump provides fluid transport within the internal volumes, i.e. conduits, of the filtration device. The filtration device may also comprise a plurality of pumps. The type of the pump(s) used is not limited.

The filter comprises one or more filter media such as, for example, a membrane, metal and/or ceramic. The filter media can be shaped, e.g., as a flat membrane or as a hose with either a single or multichannel flow-through. Advantageously, the ingredient of interest will be retained by the filter media or alternatively the ingredient of interest will pass through the filter media.

Valves may be arranged in the flow circuitry to selectively regulate the fluid flow within the respective internal volumes of the filtration system. Valves may also be positioned such that fluid can be added or extracted from the flow circuitry. The valves may be arranged inside, outside or partially inside the cabinet.

Preferably, the filtration system further comprises a control printed circuit board (PCB) configured to communicate with the filtration device and/or the weighing device, wherein the control PCB is preferably arranged inside the cabinet.

The control PCB can be configured to exchange data with the filtration device and/or weighing device. It may be capable of recording data and coordinating the operation of the filtration device and/or weighing device. Any data related to the filtration device and/or weighing device may be collected using sensors at various positions in the filtration system.

Preferably, the filtration system is a crossflow filtration system or a dead-end filtration system.

According to another aspect of the present invention a weighing device for a filtration system, particularly a crossflow filtration system, is provided, comprising: a load cell configured to weigh a filtrate or retentate vessel of the crossflow filtration system; wherein the load cell is arranged inside an enclosure configured to provide a specified environment for stable or stabilized conditions in its interior, particularly with respect to humidity and/or temperature; and wherein the enclosure is configured to be arranged inside a cabinet of the filtration system.

A load cell can be exposed to a force to be measured, which is in the present case a weight. It creates an electrical signal that is directly proportional to the applied force. The load cell can be of any type and design. For example, the load cell can be a piezoelectric or strain gauge load cell. Advantageously, load cells are easy and cost efficient to implement and ensure effective, reliable, accurate weight measurements.

The enclosure defines an enclosure inside and an enclosure outside, wherein preferably the enclosure provides an enclosed volume. The enclosure can be of any material or material combination. Potentially the enclosure could be manufactured from an open pored buffer material, e.g., sintered nylon or unfired ceramic, and the external surface of the enclosure could be sealed with a water vapor barrier material. Advantageously, the enclosure minimizes the influence of any environmental factors on the weighing device as well as the magnitude of random and systematic measurement errors. Incorporating the weighing device within the cabinet advantageously enables to maintain the design of compact and small scale systems. Pressure differences may exist between the inside and the outside of the cabinet, wherein such pressure differences create an offset of the weight measured. It is also known that air draft causes weight reading instabilities. Any offset and instability due to pressure differences and/or draft are at least minimized or even prevented by housing the weighing device in an enclosure that in turn is housed inside the cabinet.

In particular, a stabilized environment regarding humidity and/or temperature around the weighing device is desirable for an increased weight reading stability. Filtrations may be conducted over various time durations. Advantageously, the enclosure provides a stabilized environment in its interior over the whole filtration process time. In many applications it is desirable that the enclosure provides stabilized condition in its interior up to about 6 hours, preferably up to about 12 hours and more preferably up to about 24 hours. In this context stabilized particularly means that a rate of change of the humidity and/or temperature in the interior has a time constant T of at least about 2 hours, more preferably of at least about 5 hours.

Advantageously the weighing device provides an improved weight reading stability over an extended period at low manufacturing costs.

These and other objects, features and advantages of the present invention will become more apparent upon reading of the following detailed description of preferred embodiments and accompanying drawings. It should be understood that even though embodiments are separately described, single features thereof may be combined to additional embodiments.

Figure 1:
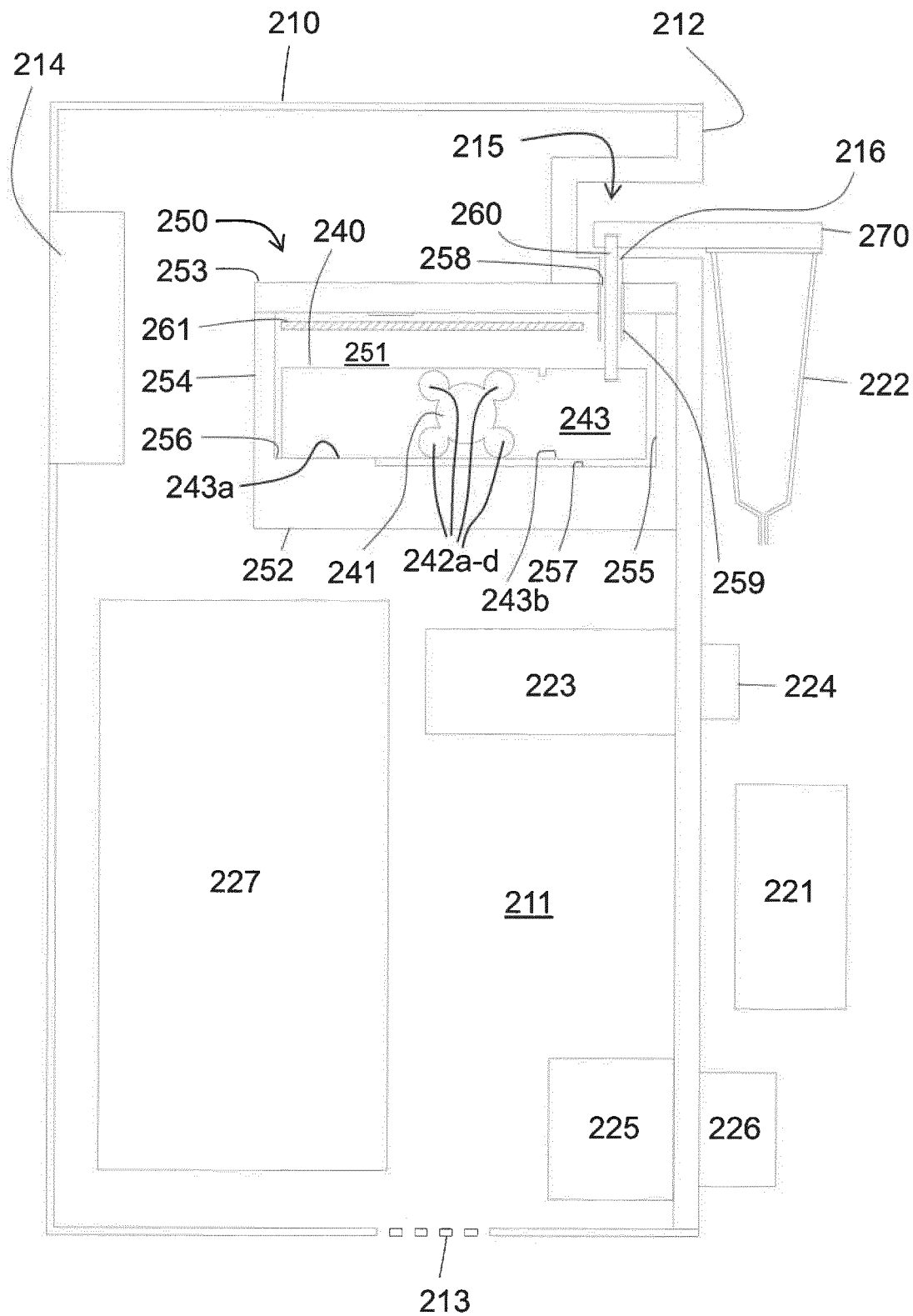
FIG. 1 shows a schematic illustration of the crossflow filtration system according to an embodiment.

In the following, an embodiment of the invention will be described with respect to a cross-flow filtration system 200. It should be, however, understood that the invention is equally applicable to other filtration systems such as a dead-end filtration system. FIG. 1 shows a schematic illustration of a crossflow filtration system 200 according to a particular embodiment to be applied to process, e.g., fluids, emulsions, suspensions, beverages, such as water, juice, beer, wine, whey, milk, sewage and/or solutions, e.g., for biotechnological, pharmaceutical, biopharmaceutical, biogenetic, medical, chemical, cosmetic and/or laboratory applications. It should be understood that the type and design of the crossflow filtration system is not limited. It is preferably designed for microfiltration, ultrafiltration, nanofiltration, pervaporation and/or reverse osmosis applications. The crossflow filtration system may be designed for the filtration of solid and/or gaseous materials.

The crossflow filtration system 200 comprises a feed vessel for a feed or medium to be filtered, at least one membrane (as a filter 221) and a retentate vessel 222 and/or a filtrate vessel (not shown). In the cross flow filtration process, the medium or feed to be filtered from the feed vessel is substantially tangentially passed across the filter membrane particularly at positive pressure relative to the permeate side. A proportion of the material which is smaller than the membrane pore size passes through the membrane as permeate or filtrate and is collected in a permeate vessel, while the remainder is retained on the feed side of the membrane as retentate and collected in the retentate vessel 222. Accordingly, in the crossflow filtration the substantially tangential motion of the bulk of the fluid across the membrane causes trapped or retained particles on the filter surface to be separated or rubbed off. The cross-flow filtration system may comprise a cross-flow filtration device and assembly comprising filter cassettes as described in WO 01/49400 A1, which is incorporated herein in its entirety by reference.

The crossflow filtration system 200 further comprises a load cell 240 as a particular example of a weighing device. The load cell can be exposed to a force to be measured, such as a weight and create an output (such as electrical signal) that is related (particularly directly proportional) to the applied force. The load cell can be of any type and design. For example, the load cell can be or comprise a piezoelectric and/or strain gauge load cell. By means of a mechanical construction, the force being applied deforms the at least one strain gauge and/or piezoelectric element. Particularly, the load cell 240 may comprise one or more strain gauges (not shown). The strain gauge typically measures or senses the deformation (strain) as a change in electrical resistance, which is a measure of the strain and hence the applied force(s). The load cell 240 may comprise four strain gauges in a Wheatstone bridge configuration. However, the load cell may have only one strain gauge (quarter bridge) or two strain gauges (half bridge).

The load cell 240 may comprise a beam or structural member 243 that deforms or bends when weight is applied onto which the one or more strain gauges themselves are bonded. It may be particularly advantageous to implement four strain gauges in view of improving sensitivity and/or temperature compensation. In such case, two of the four strain gauges are used in tension (tension strain gauges) and two of the four strain gauges are used in compression (compression strain gauges), and may be wired with compensation adjustments. The strain gauges may be mounted in areas of the load cell 240, particularly of the beam or structural member, that exhibit strain in compression or tension upon application of a force. When weight is applied to the load cell 240, the compression strain gauges are compressed, thus decreasing their resistances, while (particularly simultaneously), the tension strain gauges are stretched, thus increasing their resistances. The change in resistances causes more current to flow through compression strain gauges and less current to flow through the tension strain gauges, so that a potential difference can be detected between output or signal leads of the load cell 240. The strain gauges particularly are mounted in a differential bridge to enhance measurement accuracy, so that when a force (such as a weight) is applied, the strain changes the electrical resistance of the strain gauges particularly in proportion to the load.

Furthermore, the load cell 240 (as the particular weighing device) is enclosed by an enclosure 250, which may comprise a body 252 and a cover 253 that is detachably fixed to the body 252, preferably by one or more screws. Additionally, a seal (not shown), for example a polymer gasket, particularly may be disposed to or on the body 252 and/or the cover 253 in order to seal the enclosure 250 at the contact surface between the cover 253 and body 252. The load cell 240 is arranged in or on an enclosure interior 251, wherein the enclosure 250 is in turn arranged in a cabinet interior 211. The load cell 240 is to be connected to a retentate vessel 222 via a load cell connector 260 and a vessel connector 270. Thus, a weight originating from the retentate vessel 222 is transferred to the load cell 240 via the load cell connector 260 and the vessel connector 270. The load cell connector 260 particularly substantially extends vertically upward through an aperture 258 in the cover 253 and an aperture 216 in the cabinet 210 to the outside of the cabinet 210. While in the preferred embodiment the load cell 240 is to be connected to the retentate vessel 222, it should be understood that the load cell may be equally connected with a filtrate vessel (not shown) to allow the weight measurement of the filtrate vessel. It should be understood that the invention is equally applicable to this extent.

The aperture 216, aperture 258 and load cell connector 260 define a diffusion path. The diffusion path can be understood as an air gap that enables an (particularly unwanted) air exchange between the enclosure inside or interior 251 and the enclosure outside. In other words, air might diffuse into the enclosure inside 251 over the diffusion path. The enclosure may further comprise at least one sleeve 259 in correspondence with the aperture 258, particularly on an inner surface of the aperture 258. The sleeve 259 at least partly extends into the enclosure inside or interior 251, thereby extending the diffusion path. Particularly, the sleeve 259 may be shaped such that it may extend the length of the diffusion path by at least about 50%. A gap defined between the load cell connector 260 and the aperture 258 may be in the range of about 0.25 to about 2 mm. The longitudinal extension of the aperture 258 (i.e. the length of the aperture 258 in thickness direction of the cover 253) may be in the range of about 5 to about 20 mm. Particularly, the aperture and the load transfer connection define a diffusion path having a depth to aperture area ratio in the range of approximately 1:5 to approximately 1:20, preferably of approximately 1:8 to 1:15, more preferably of approximately 1:10 to 1.15.

At least one humidity buffer 261 is provided to the enclosure inside 251 in order to minimize a modification in humidity in the enclosure inside 251. Additionally or alternatively, at least one temperature buffer (not shown) may be arranged in or on the enclosure inside 251 to stabilize the temperature.

Figure 7:
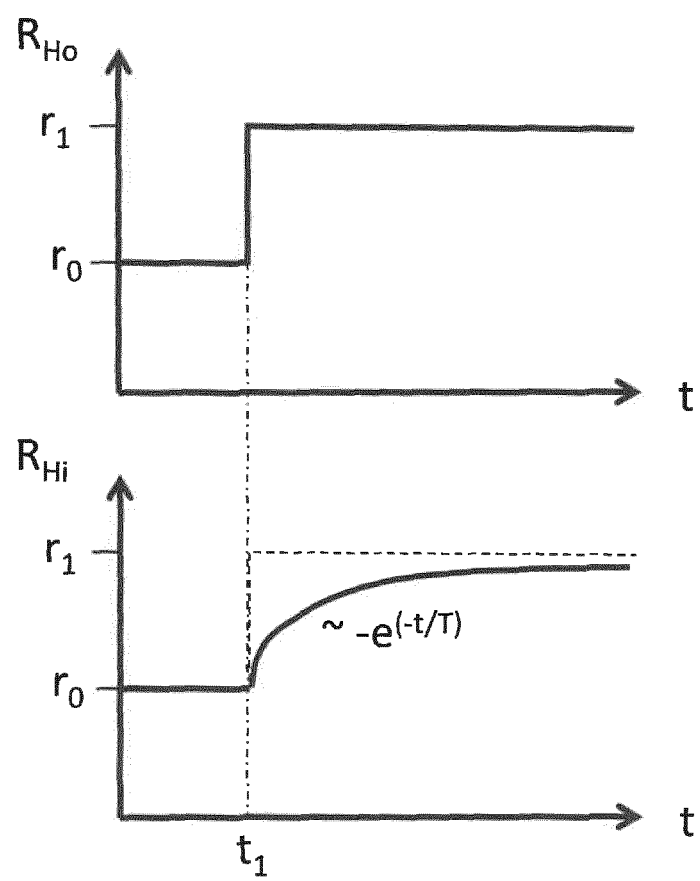
FIG. 7 shows an upper schematic graph representing a level of humidity $R_{Ho}$ on an outside of an enclosure and a lower schematic graph shows a humidity level $R_{Hi}$ in an interior of the enclosure.

Accordingly, the enclosure 250 allows to have a stable or stabilized environment in correspondence with or substantially around the weighing device (particularly the load cell 240) regarding humidity and/or temperature thus allowing for an increased weight reading stability. Filtration processes may be conducted specifically over various time durations. Advantageously, the enclosure 250 provides a stable or stabilized environment in its enclosure inside or interior 251 particularly over the whole filtration process time. In many applications it is desirable that the enclosure 250 provides stable or stabilized condition in its interior 251 up to 6 about hours, preferably up to about 12 hours and more preferably up to about 24 hours. In this context stable or stabilized particularly means that a rate of change of the humidity and/or temperature in the interior has a time constant T of at least about 2 hours, more preferably of at least about 5 hours. With reference to FIG. 7, an upper schematic graph represents the level of humidity $R_{Ho}$ on the outside of the enclosure 250 and a lower schematic graph shows the humidity level $R_{Hi}$ in the interior 251 of the enclosure 250, which is influenced by the level of humidity $R_{Ho}$. When sufficient time has passed, both humidity levels $R_{HO}$ and $R_{Hi}$ are substantially the same (e.g. situation for $t<t_1$ where $R_{Ho}$ and $R_{H1}$ both have a value $r_0$). Once the outside humidity $R_{Ho}$ varies e.g. due to changes in the weather conditions (schematically shown for $t=t_1$ where $R_{Ho}$ changes its value to $r_1$) the humidity level $R_{Hi}$ of the interior 251 will start changing as well, but in a different manner (or with a different temporal response) as compared to $R_{Ho}$, namely $R_{Hi}$ may change in a way substantially proportional to $(-e^{(-t/T)})$, where T represents the time constant of the rate of change of the humidity in the interior 251. Accordingly, as can be seen, the enclosure 251 provides a dampening effect for the change of the humidity $R_{Hi}$ in the interior 251 of the enclosure 250. The time constant particularly is at least about 2 hours, more preferably at least about 5 hours. A similar behavior applies also to modifications of the temperature at the outside of the enclosure 250 and in the interior 251 of the enclosure 250, since the enclosure 250 provides for an insulation of the interior 251 with respect to the outside of the enclosure 250.

A cabinet 220 is provided for at least partly containing the enclosure 250 and other elements (to be described later) and comprises a plurality of walls (side walls not shown) that define the cabinet inside or interior 210. A ventilation system, comprising one or more air vents 213 and/or a forcible ventilation unit (particularly comprising a fan 214), is provided to cabinet 210. The ventilation system is configured to exchange the cabinet inside air with ambient air particularly in order to maintain the cabinet inside temperature close to ambient. Process fluids that flow through conduits in the cabinet inside can be cooled down due to convection effects of the ventilation. A pump is mounted to the cabinet 210 such that the pump motor 225 is located in the cabinet inside 211 and the pump head 226 outside of the cabinet 220 e.g. on the cabinet front panel 212. A valve is mounted to the cabinet 220 particularly such that the valve actuator 225 is located in the cabinet inside 211 and the valve head 226 outside the cabinet 220 e.g. on the cabinet front panel 212. The crossflow filtration system 200 may comprise additional pumps and valves. The filter 221 comprising one or more membranes is preferably arranged in the cabinet outside and comprises at least one inlet, one outlet and at least one filter medium (not shown). The filter medium may include at least one membrane, wherein the membrane may be flat or hollow in configuration (not shown). The retentate vessel 222 is arranged outside the cabinet. Various conduits (not shown) connect the retentate vessel 222, filter, pumps and valves so as to fluidically couple them, thus forming a flow circuitry (not shown). The flow within the flow circuitry particularly is driven by the operation of the pump(s) and valve(s).

The retentate vessel 222 is mounted to the vessel connector 270 that particularly extends substantially horizontally into a (particularly substantially cuboid) recess 215 of the cabinet 210. A (particularly substantially vertical extending) aperture 216 is arranged in the recess 215 and at least partly aligned with the aperture 258 in the enclosure 250 so that the load cell connector 260 can extend particularly substantially vertically upward from the load cell 240 through the aperture 258 and aperture 216 to the outside of the cabinet 210. The load cell connector 260 is to be connected with the vessel connector 270 so as to transfer the weight of the retentate vessel 222 to the load cell 240.

The load cell 240 as a particular weighing device serves for determining the weight of the retentate vessel 222. The load cell 240 preferably comprises a (particularly substantially cuboid-shaped) beam or structural member 243 made of metal such as from aluminum. The load cell 240 may comprise a spring member having a large through hole 241 including four small through holes 242a-242d particularly substantially arranged symmetrically around the large through hole 241, wherein the two small through holes 242a-242b are arranged close to the load cell's top (particularly substantially at the same height) and the two small through holes 242c-242d are arranged close to the load cell's bottom (particularly substantially at the same height). Four strain gauges (not shown) are preferably located on the top and bottom surface of the load cell 240 and substantially aligned small through holes 242a-242d. By interconnecting the strain gauges, preferably in a Wheatstone bridge configuration, the change in electrical resistance as a result of a load cell deformation can be measured and the weight of the retentate vessel 222 can be determined.

The load cell 240 is arranged in the enclosure inside or interior 251. The enclosure 250 comprises on its inner bottom side a platform 256 that is higher or projecting more inwardly than a bottom surface 257 of the enclosure 257. The platform 256 is adjacent to the lateral (left) side wall 254. A supported portion 243a of the beam 243 of the load cell 240 is to be placed and supported on the platform 256 so that a gap between a non-supported portion 243b of the beam 243 of the load cell 240 and the bottom surface 257 is defined. As a result, the load cell 240 is bendable around the platform's 256 edge when the non-supported portion 243b approaching the bottom surface 257 due to the force acting on the beam 243.

Depending on the magnitude of the retentate vessel's weight, the load cell 240 deflects correspondingly. This deflection causes a deformation of the beam 243 and, thus, of the strain gauges arranged thereon resulting in a change in their electrical resistance. The change in electrical resistance or any related physical dimension (such as a current passing through the strain gauges) is a measure for the weight of the retentate vessel 222.

The cabinet 210 further houses a control printed circuit board (PCB) 217 that is configured to exchange data with the filtration device, the weighing device and/or the ventilation system. The data exchange may contain control commands, for example to control the filtration device and/or the ventilation system. The control PCB 217 may also be configured to record data and/or transmit data to further electronic devices. The controller PCB 217 may be connected to the pump(s), valve(s), load cell, fan and/or other components of the system 200 by one or more wired connections (such as fibers and/or cables) and/or wireless connections.

Figure 2:
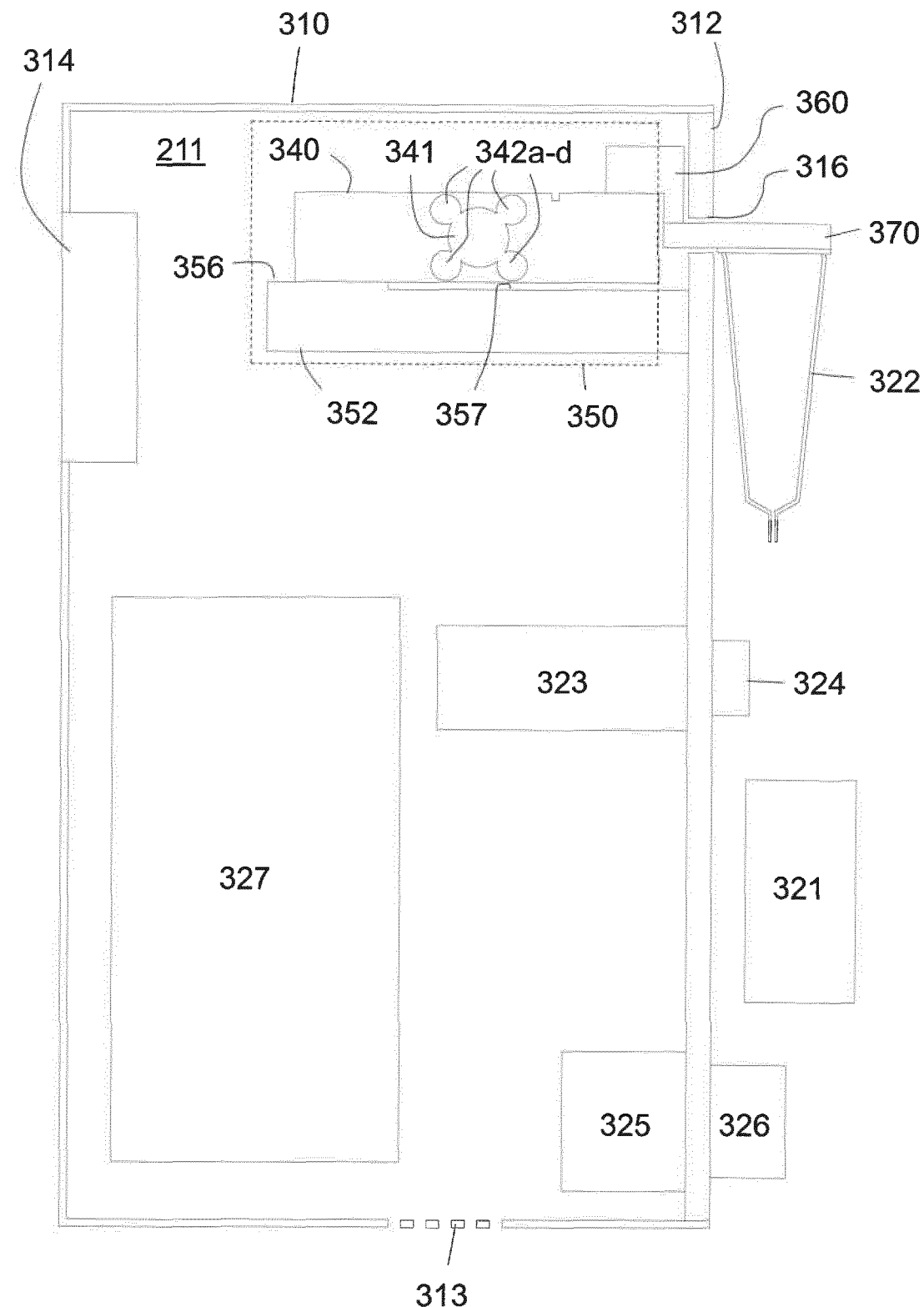
FIG. 2 shows a schematic illustration of the crossflow filtration system according to a further embodiment.

FIG. 2 shows a schematic illustration of a crossflow filtration system 300 according to a further embodiment. The crossflow filtration system 300 is a modification of the crossflow filtration system 200, wherein a portion of a vessel connector 370 extends substantially horizontally through a cabinet 310. The vessel connector 370 is connected in a cabinet inside or interior 311 to a load cell connector 360, wherein the load cell connector 360 is attached or connected to a top surface of a load cell 340. The design of load cell connector 360 and vessel connector 370 may be varied such that the load cell connector 360 extends substantially horizontally through the cabinet 310 and/or is connected outside the cabinet to the vessel connector 370. Accordingly, a force transmission point of the gravitational force of or from the retentate vessel 322 to the load cell 340 is located substantially on a neutral axis of the load cell 340 (particularly of its beam or structural member 343). With the horizontal through-wall configuration of either the load cell connector 360 or vessel connector 370, there is no need for a recess in the cabinet as shown in FIG. 1. Furthermore, any vertical force on the load cell 340 caused by pressure differences between the cabinet inside and cabinet outside are minimized. As a result, the weight reading stability of the load cell 340 is increased.

Similar to the embodiment of FIG. 1, the load cell 340 serves for determining the weight of a retentate vessel 322. The load cell 340 preferably comprises a (particularly substantially cuboid-shaped) bending beam 343 particularly made from metal such as aluminum. The load cell 340 may comprise a spring member having a large through hole 241 including four small through holes 342a-342d arranged particularly substantially symmetrically around the large through hole 341, wherein the two small through holes 342a-342b are arranged close to the load cell's top (particularly substantially at the same height) and the two small through holes 342c-342d are arranged close to the load cell's bottom (particularly substantially at the same height). Similar to the embodiment of FIG. 1, four strain gauges (not shown) are preferably located on the top and bottom surface of the load cell 340 and substantially corresponding to (particularly aligned with) the small through holes 342a-342d. By interconnecting the strain gauges, preferably in a Wheatstone bridge configuration, the change in electrical resistance as a result of a load cell deformation can be measured and the weight of the retentate vessel 322 can be determined.

The load cell 340 is arranged in the cabinet inside 352 on the platform 356 on the base 352. The platform 356 that is higher or projecting more inwardly than the base surface 357. Similar to the embodiment of FIG. 1, a portion of the load cell 340 is placed and supported on the platform 356 so that a gap between the other non-supported portion of the load cell 340 and the bottom surface 357 exists. As a result, the load cell 340 is bendable around the platform's 356 edge.

Depending on the magnitude of the retentate vessel's weight, the load cell 340 deflects. This deflection causes a deformation of the strain gauges resulting in a change in their electrical resistance. The change in electrical resistance is a measure for the weight of the retentate vessel 322.

The load cell may further be arranged in an enclosure (not shown). This enclosure may be the same or substantially as that described in connection with FIG. 1. It is noted that modifications to the enclosure 250 and/or load cell connector 360 and/or vessel connector 370 may be made to provide a horizontal through-wall configuration of either the load cell connector 360 or vessel connector 370.

Similar to the embodiment of FIG. 1, the cabinet 320 comprises a plurality of walls (side walls not shown) that define a cabinet inside or interior 313. If an enclosure is provided for the weighing device (particularly for the load cell 340), such enclosure is contained within the container 320. A ventilation system, comprising one or more air vents 310 and/or a forcible ventilation system (particularly comprising at least one fan 314), is provided to cabinet 310. The ventilation system is configured to exchange the cabinet inside air with ambient air in order to particularly maintain the cabinet inside temperature close to ambient. Process fluids that flow through conduits in the cabinet inside can be cooled down due to convection effects of the ventilation. A pump is mounted to the cabinet 310 particularly such that the pump motor 325 is located in the cabinet inside 311 and/or the pump head 326 outside of the cabinet 320 e.g. on the cabinet front panel 312. A valve is mounted to the cabinet such that the valve actuator 325 particularly is located in the cabinet inside 311 and the valve head 326 outside the cabinet e.g. on the cabinet front panel 312. The crossflow filtration system 300 may comprise additional pumps and valves. The filter 321 is preferably arranged in the cabinet outside and comprises at least one inlet, one outlet and a filter medium (not shown). The filter medium may include at least one membrane, wherein the membrane may be flat or hollow in configuration (not shown). The retentate vessel 322 is arranged outside the cabinet. Various conduits (not shown) connect the retentate vessel, filter, pumps and valves so as to fluidically couple them, thus forming a flow circuitry (not shown). The flow within the flow circuitry is driven by the operation of the pump(s) and valve(s).

The cabinet 310 further houses a control PCB 317 that is configured to exchange data with the filtration device, the weighing device and/or the ventilation system. The data exchange may contain control commands, for example to control the filtration device and/or the ventilation system. The control PCB 317 may also be configured to record data and/or transmit data to further electronic devices. The controller PCB 317 may be connected to the pump(s), valve(s), load cell, fan and/or other components of the system 300 by one or more wired connections (such as fibers and/or cables) and/or wireless connections.

Figure 3:
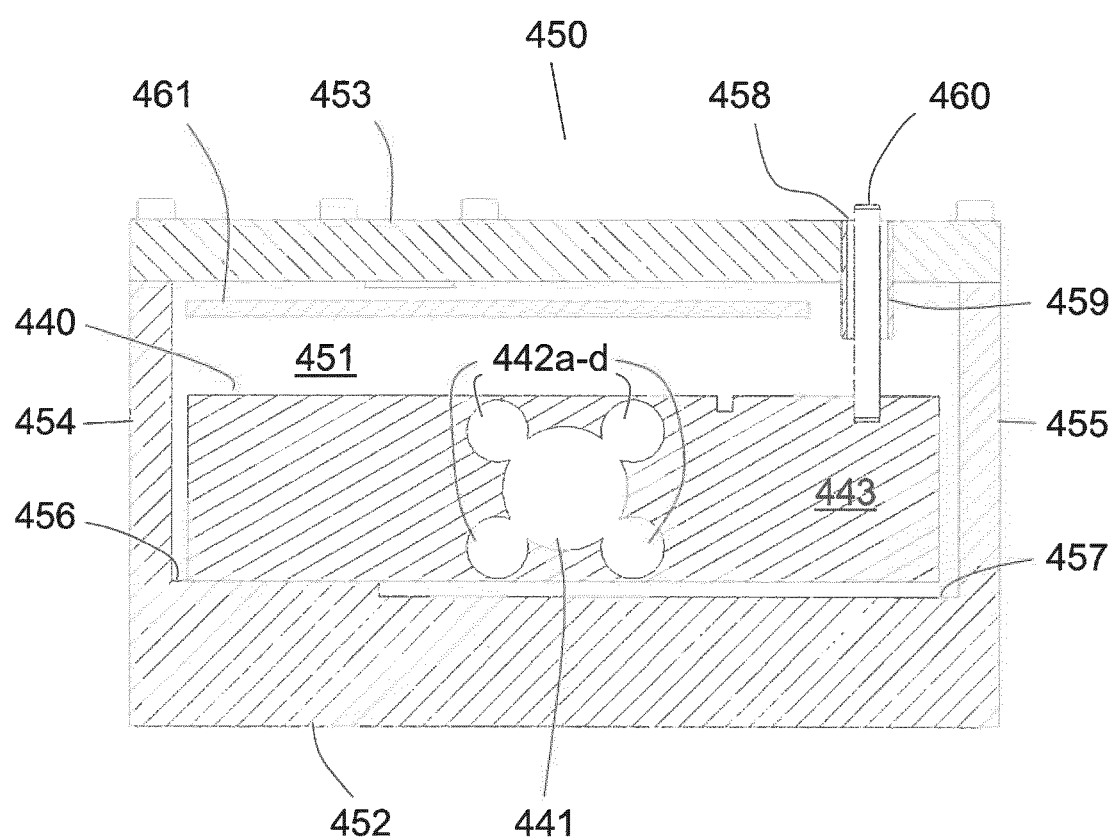
FIG. 3 shows a schematic illustration of the weighing device according to one embodiment.

FIG. 3 shows a cross section through a weighing device 400 according to another embodiment that is configured to weigh a retentate vessel of a crossflow filtration system. The weighing device 400 particularly comprises at least one load cell 440 that is arranged inside an enclosure 450. It is noted that the load cell 440 may be sensitive to any changes in relative humidity and/or temperature. Therefore, housing the load cell 440 inside the enclosure 450 creates a stabilized environment for the load cell, particularly with respect to humidity and/or temperature.

The enclosure 450 comprises a body 452 and a cover 453 that is detachably fixed to the enclosure body 452, preferably by one or more screws. Additionally, a seal (not shown), for example a polymer gasket, may be disposed to the body 452 and/or the cover 453 in order to seal the enclosure 450 at the contact surface between the cover 453 and body 452.

The load cell 440 serves for determining a weight that is applied to the load cell, preferably a weight of the retentate vessel of the crossflow filtration system described above. Similar to the embodiments of FIGS. 1 and 2, the load cell 440 preferably comprises a (particularly block- or cuboid-shaped) beam or member 443 made from metal. The load cell 440 may comprise a spring member having a large through hole 441 including four small through holes 442a-442d arranged substantially symmetrically around the large through hole 441. One or more strain gauges (not shown) are preferably located on the top and bottom surface of the load cell 440 and/or arranged in correspondence with or substantially aligned small through holes 442a-442d. By the change in electrical resistance of the strain gauges, as a result of a load cell deformation, can be measured and the applied force can be determined.

The load cell 440 is arranged in an enclosure inside or interior 451 of the enclosure 450. Similar to the embodiments of FIGS. 1 and 2, the load cell 440 is supported on a platform 456 of the enclosure 450, which is offset or projecting more inward than a bottom surface 457 of the enclosure 450 so that so that a gap is defined between a portion of the load cell 440 and the bottom surface 457. As a result, the load cell 440 is bendable around the platform's 456 edge as a consequence of a force acting thereon.

The enclosure 450 further comprises an aperture 458 in the cover 453. The load cell connector 460 is to be fixed to the top surface of the load cell 450 and particularly substantially extends vertically upward through the aperture 458, so that a force can be transferred to load cell 440.

The aperture 458 and the load cell connector 460 define a diffusion path. The diffusion path can be understood as an air gap that enables an (particularly unwanted) air exchange between the enclosure inside 451 and the enclosure outside. In other words, air might diffuse into the enclosure inside 451 over the diffusion path. Similar to the embodiment of FIG. 2, the enclosure may further comprise a sleeve 459 arranged in correspondence to the aperture 458, particularly on the inner surface of the aperture 458. The sleeve 459 extends into the enclosure inside or interior 451, thereby extending the diffusion path. A humidity buffer 461 is provided to the enclosure inside 451 in order to minimize a change in humidity in the enclosure inside.

The weighing device 400 may further comprise a heating system (not shown) capable of providing a specified (predetermined or predeterminable) temperature in the enclosure inside 451 in order to maintain the load cell 440 at a specified, preferably constant temperature. The heating system may comprise a temperature sensor, a resistive heater and/or a controller such as a proportional-integral-derivative (PID) controller. To reach a desired temperature set point, the resistive heater heats the enclosure 450. The PID controller in combination with the temperature sensor may control the heat emission of the resistive heater. Alternatively, instead of a resistive heater, a Peltier device, which can heat and cool, can be used. Advantageously, there is no time needed to get to the temperature set point as the Peltier device can maintain the temperature at the temperature at the time of power up. If using a heating system the enclosure is preferably made from aluminum or any other material with high thermal conductivity to provide an even temperature distribution.

The weighing device 400 may further be connectable to a control printed circuit board (PCB) (not shown). Such a control PCB may be configured to exchange data with the load cell and the heating system. The connection between the control PCB and the weighing device is preferably set up by cables and/or wireless connections.

Figure 4:
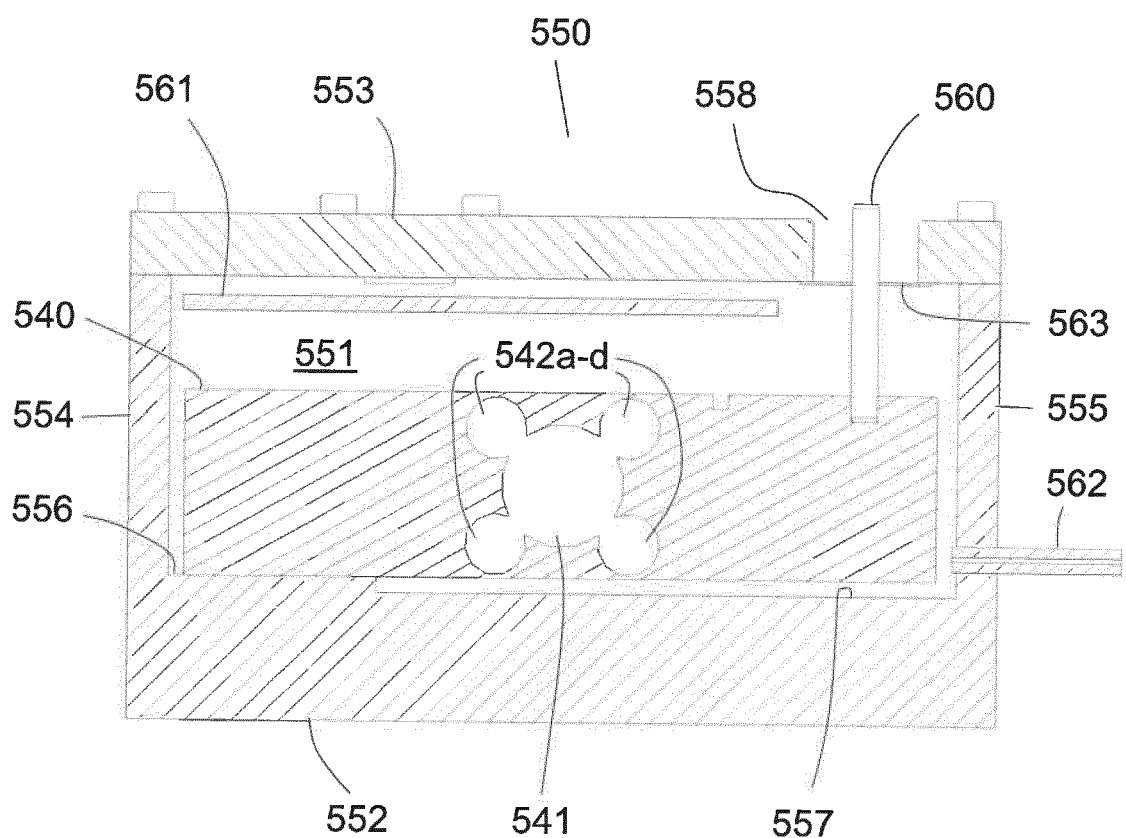
FIG. 4 shows a schematic illustration of the weighing device of FIG. 3 further including a membrane sealed diffusion path.

FIG. 4 shows a schematic illustration of a weighing device 500 according to another embodiment. The weighing device 500 is a modification of the weighing device 400. In order reduce diffusion through the aperture 558 and especially water vapour flux, a seal 563 may be used. The weighing device 500 additionally includes a thin flexible seal 563 that is configured to seal an aperture 558 of the enclosure 450. The seal 563 spans the gap that is defined by the aperture 558 and the load cell connector 560. Thus, the diffusion path is at least partially sealed. Preferably, the seal 563 comprises a flexible membrane with low water vapour permeability. With the seal 563 the enclosure 550 is configured such that it can be vented so that the pressure in the enclosure inside 551 and outside the enclosure 550 particularly substantially stay in equilibrium, when atmospheric temperature and pressure changes. Therefore, the enclosure 550 comprises a vent 562 particularly designed as a tube, particularly having a diameter/length ratio of no more than about 1:10, preferably of no more than about 1:20. In FIG. 4, the vent 562 particularly is arranged at the lateral (e.g. right) side wall 555, but it could also be arranged at another lateral wall such as a left side wall 554 or the cover 553.

Figure 5:
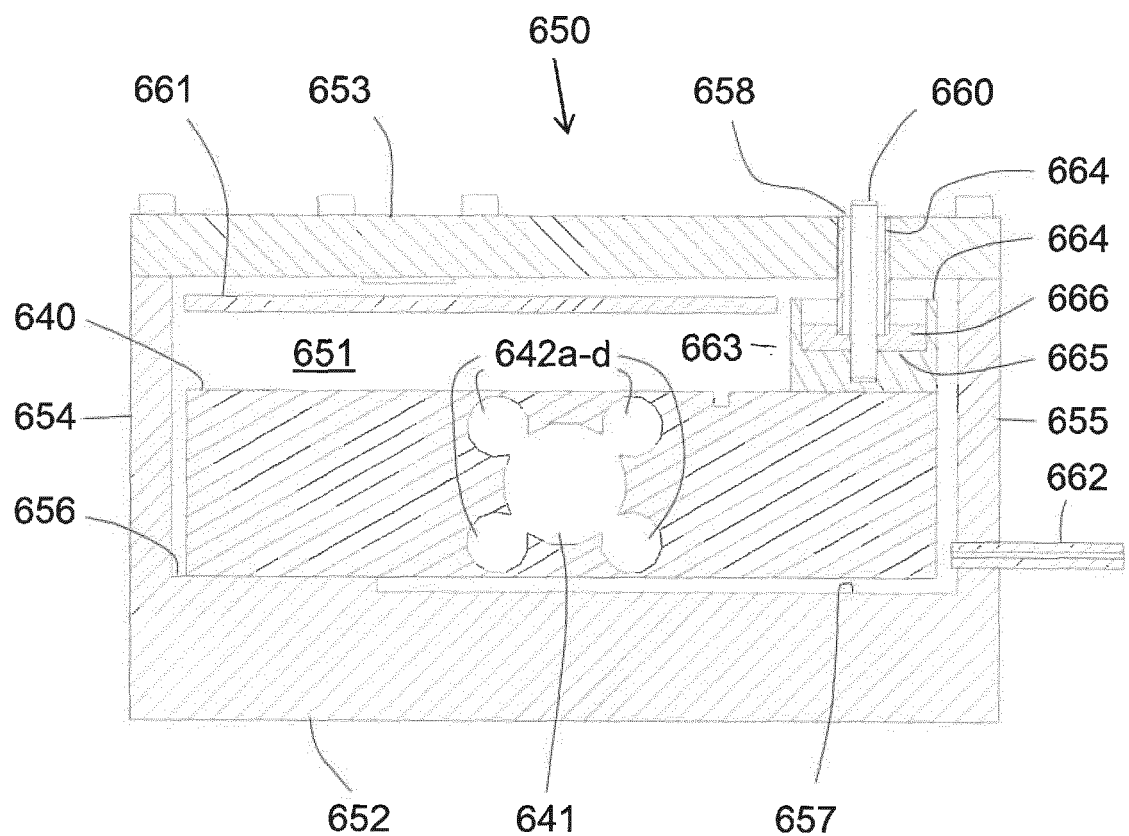
FIG. 5 shows a schematic illustration of the weighing device of FIG. 3 further including a liquid sealed diffusion path.

As an alternative to a flexible seal, the aperture 658 in the enclosure 650 may be sealed with a liquid seal 658 as shown in FIG. 5. The weighing device 600 comprises a liquid filled liquid holder cup 664 arranged on the top surface of the load cell 640, wherein the load cell connector 660 is arranged (particularly substantially centrally) in the liquid holder cup base 665 and extends upward through the aperture 658. The weight to be measured is transmitted via the load cell connector 660 and the liquid holder cup 664 to the load cell 640. The liquid holder cup 664 is at least partially filled with the liquid 666 such that the sleeve 659 dips into the liquid. Accordingly, the diffusion path is at least partially sealed. The liquid has preferably a low vapour pressure and/or is low- or non-hygroscopic, such as a silicone oil. Also with the liquid seal 658 the enclosure 650 is advantageously vented such that the pressure in the enclosure inside 651 and outside the enclosure 650 may stay substantially in equilibrium when atmospheric temperature and/or pressure changes. Therefore, the enclosure 650 comprises a vent 662 particularly designed as a tube.

Figure 6:
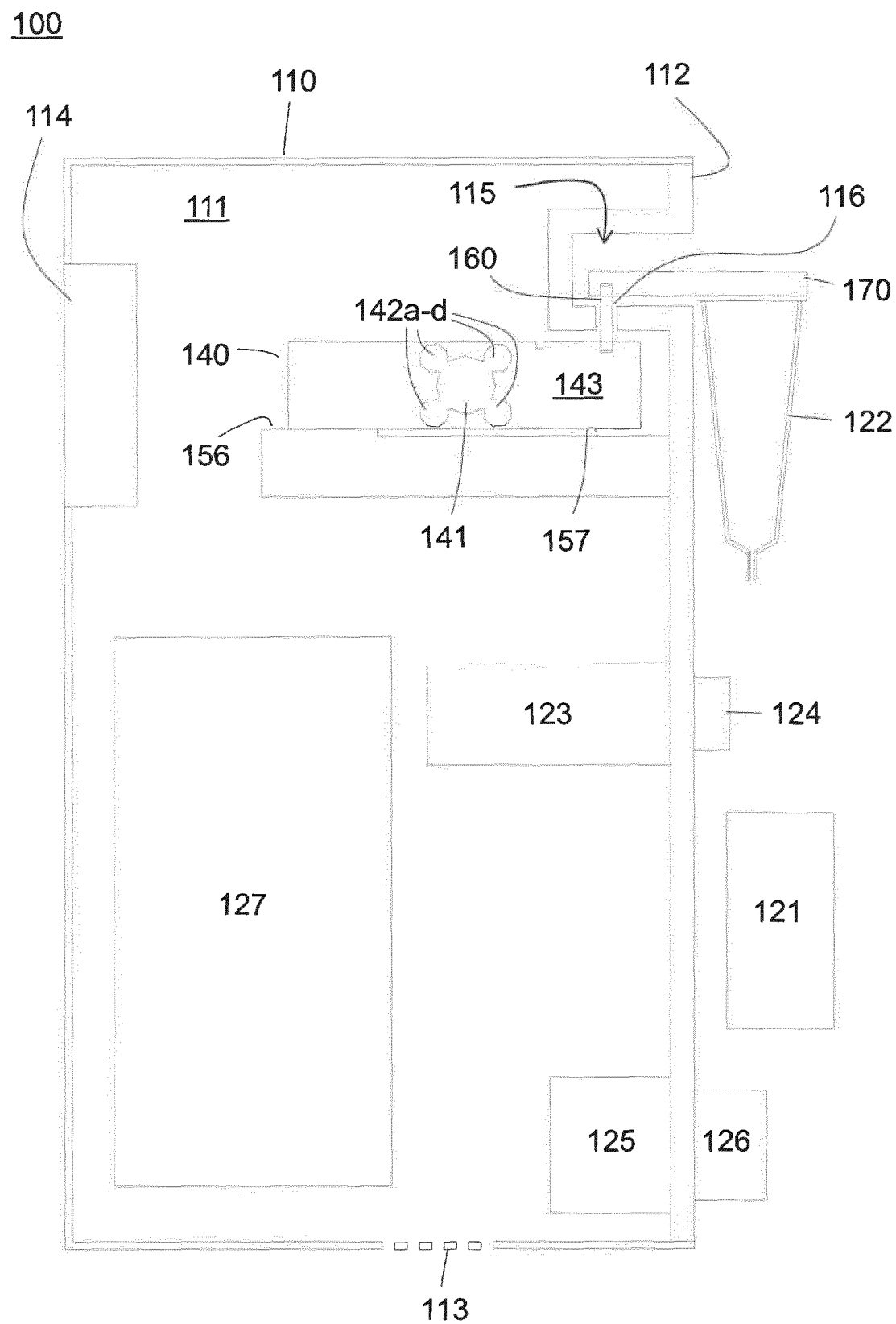
FIG. 6 shows a schematic illustration of the crossflow filtration system according to one embodiment.

According to another aspect, there is disclosed a crossflow filtration system 100 comprising: a cabinet 110; a filtration device having a retentate vessel 122 arranged outside the cabinet 210; and a weighing device that is configured to weigh the retentate vessel 122. A particular example thereof is described in connection with FIG. 6 which shows a schematic illustration of the cross flow filtration system 100. The cabinet 110 comprises a plurality of walls that define a cabinet inside or interior 111. A ventilation system, comprising one or more air vents 113 and/or a forcible ventilation unit particularly comprising at least one fan 114, is provided to the cabinet 110. The ventilation system is configured to exchange the cabinet inside air with ambient air in order to maintain the cabinet inside temperature close to ambient. Process fluids that flow through one or more conduits in the cabinet inside 111 can be cooled down due to convection effects of the ventilation. A pump is mounted to the cabinet 111 particularly such that a pump motor 123 is located in the cabinet inside 111 and/or a pump head 124 outside the cabinet e.g. on a cabinet front panel 112. A valve is mounted to the cabinet 110 particularly such that a valve actuator 125 is located in the cabinet inside 111 and/or a valve head 126 outside the cabinet e.g. on the cabinet front panel 112. The crossflow filtration system 100 may comprise additional pumps and valves. A filter 121 is preferably arranged in the cabinet outside and comprises at least one inlet, one outlet and a filter medium (not shown). The filter medium may include at least one membrane, wherein the membrane may be flat or hollow in configuration (not shown). A retentate vessel 122 is located outside the cabinet 110. Various conduits (not shown) connect the retentate vessel 122, filter 121, pump(s) and/or valve(s) so as to fluidically couple them, thus forming a flow circuitry (not shown). The flow within the flow circuitry is driven by the operation of the pump(s) and valve(s).

The retentate vessel 122 is mounted to a vessel connector 170 that particularly substantially extends horizontally into a (particularly substantially cuboid) recess 115 in the front panel 112. A vertical extending aperture 116 is arranged in the recess 115 so that that the load cell connector 160 can extend substantially vertically upward from the load cell 140 through the aperture 161. The load cell connector 160 is connected with the vessel connector 170 so as to transfer the weight of the retentate vessel to the load cell 140.

The load cell 140 may be used for determining the weight of the retentate vessel 122. The load cell 140 preferably comprises a (particularly substantially block- or cuboid-shaped) bending beam made of metal such as aluminum. The load cell 140 comprises a spring member having a large through hole 141 including four small through holes 142a-142d arranged substantially symmetrically around the large through hole 141, wherein the two small through holes 142a-142b are arranged close to the load cell's top (particularly substantially at the same height) and the two small through holes 142c-142d are arranged close to the load cell's bottom (particularly substantially at the same height). A plurality of strain gauges (not shown) are preferably located on (particularly the top and/or bottom surface of) the load cell 140 and aligned with one or more of the small through holes 142a-142d. By particularly interconnecting the strain gauges, preferably in a Wheatstone bridge configuration, the change in electrical resistance as a result of a load cell deformation can be measured and the weight of the retentate vessel 122 can be determined.

The load cell 140 is to be arranged in a cabinet inside or interior 152 on a platform 156 on a base 152. The platform 156 that is higher or projecting more upward than the base surface 157. A portion of the load cell 140 is placed and supported on the platform 156 so that a gap is defined between a non-supported portion of the load cell 140 and the bottom surface 157. As a result, the load cell 140 supported on the platform 156 is bendable around the platform's 156 edge as a consequence of a load acting thereon.

Depending on the magnitude of the retentate vessel's 122 weight, the load cell 140 may deflect. This deflection causes a deformation of the one or more strain gauges resulting in a change in its/their electrical resistance. The change in electrical resistance is a measure for the weight of the retentate vessel 122.

The cabinet 110 further houses a control PCB 127 that is configured to exchange data with the filtration device, the weighing device and/or the ventilation system. The data exchange may contain control commands, for example to control the filtration device and/or the ventilation system. The control PCB 127 may also be configured to record data and/or transmit data to further electronic devices. The controller PCB 127 may be connected to the pump(s), valve(s), load cell, fan and/or other components of the system 100 by one or more wire-based connections (such as fibers and/or cables) and/or wireless connections.

REFERENCE SIGNS 100, 200, 300 crossflow filtration system
400, 500, 600 weighing device
x10 cabinet
x11 cabinet interior/inside
x12 front panel
x13 air vents
x14 fan
x15 recess
x16 aperture
x21 filter
x22 retentate vessel
x23 pump motor
x24 pump head
x25 valve actuator
x26 valve head
x27 control PCB
x40 load cell
x41 large through hole
x42a, x42b, x42c, x42d small through holes
243 structural member
243a supported portion
243b non-supported portion
x50 enclosure
x51 enclosure interior/inside
x52 body
x53 cover x54 left side wall
x55 right side wall
x56 platform
x57 bottom surface
x58 aperture
x59 sleeve
x60 load cell connector
x61 humidity buffer
x62 pressure equalization vent
x63 thin flexible seal/liquid filled seal
x64 liquid holder cup
x65 liquid holder cup base
x66 liquid
x70 vessel connector

The invention claimed is:

1. A filtration system comprising:
   a cabinet;
   a filtration device having a filtrate or retentate vessel arranged outside the cabinet; and
   a weighing device that is configured to weigh the filtrate or retentate vessel,
   wherein the weighing device is arranged inside an enclosure and wherein the enclosure is arranged inside the cabinet, and
   wherein the enclosure is configured to provide a stabilized environment in its interior with respect to humidity and/or temperature.

2. The filtration system according to claim 1, wherein the weighing device comprises a load cell.

3. The filtration system according to claim 2, wherein a force transmission point of a gravitational force of the filtrate or retentate vessel to the load cell is located on a neutral axis of the load cell.

4. The filtration system according to claim 1, further comprising a load transfer connection configured to connect the weighing device and the filtrate or retentate vessel so as to transfer a weight from the filtrate or retentate vessel to the weighing device.

5. The filtration system according to claim 4, wherein the enclosure further comprises an aperture, and wherein the load transfer connection extends at least partially through the aperture.

6. The filtration system according to claim 5, wherein the aperture and the load transfer connection define a diffusion path having a depth to aperture area ratio in the range of approximately 1:5 to approximately 1:20.

7. The filtration system according to claim 6, wherein the enclosure further comprises a seal configured to seal the diffusion path from the exterior of the enclosure.

8. The filtration system according to claim 6, wherein the enclosure further comprises a seal configured to seal the diffusion path from the exterior of the enclosure and a pressure equalization vent configured to equalize the pressure inside and outside the enclosure.

9. The filtration system according to claim 5, wherein the aperture and the load transfer connection define a diffusion path having a depth to aperture area ratio in the range of approximately 1:8 to 1:15.

10. The filtration system according to claim 5, wherein the aperture and the load transfer connection define a diffusion path having a depth to aperture area ratio in the range of approximately 1:10 to 1:15.

11. The filtration system according to claim 1, wherein the enclosure further comprises a pressure equalization vent configured to equalize the pressure inside and outside the enclosure.

12. The filtration system according to claim 5, wherein the enclosure comprises a cover having the aperture and an enclosure body.

13. The filtration system according to claim 12, wherein the cover is sealed to the enclosure body.

14. The filtration system according to claim 1, wherein the enclosure further comprises at least one humidity buffer and/or temperature buffer.

15. The filtration system according to claim 1, wherein a thermal insulation is provided on or within the enclosure so as to at least partially thermally insulate the weighing device from the exterior of the enclosure.

16. The filtration system according to claim 1, wherein the weighing device further comprises a temperature sensor and/or a heater arranged inside the enclosure.

17. The filtration system according to claim 1, wherein the filtration device further comprises:
   a ventilation system configured to vent the cabinet; and/or
   a pump arranged inside the cabinet; and/or
   a filter arranged outside the cabinet; and/or
   at least one valve in the filtration device and/or at an interface of the filtration device.

18. The filtration system according to claim 1, further comprising a control PCB configured to communicate with the filtration device and/or the weighing device, wherein the controller PCB is arranged inside the cabinet.

19. The filtration system according to claim 1, wherein the filtration system is a crossflow filtration system or a dead-end filtration system.

* * * * *